July 31, 1923.

L. W. JONES 1,463,510

TEMPERATURE REGULATOR FOR COOLING SYSTEMS OF INTERNAL COMBUSTION ENGINES

Filed March 21, 1923

Louis W. Jones, Inventor

By John W. Darley, Attorney

Patented July 31, 1923.

1,463,510

UNITED STATES PATENT OFFICE.

LOUIS W. JONES, OF BALTIMORE, MARYLAND.

TEMPERATURE REGULATOR FOR COOLING SYSTEMS OF INTERNAL-COMBUSTION ENGINES.

Application filed March 21, 1923. Serial No. 626,716.

*To all whom it may concern:*

Be it known that I, LOUIS W. JONES, a citizen of the United States, residing at Baltimore, in the State of Maryland, have invented certain new and useful Improvements in Temperature Regulators for Cooling Systems of Internal-Combustion Engines; and I do hereby declare the following to be a full, clear, and exact description of the invention, such as will enable others skilled in the art to which it appertains to make and use the same.

My invention relates to a temperature regulator for the cooling systems of internal combustion engines.

Among the objects of my invention are:—

To provide a temperature regulator which shall maintain the engine at a sufficiently high temperature during cool weather to enable it to start promptly.

To provide a temperature regulator comprising means for circulating the water through the cooling system of an internal combustion engine, which means are controlled by automatic devices so that they will become effective when the temperature of the water in the cooling system of the engine decreases below a predetermined limit.

To provide means for heating the water in the cooling system of an internal combustion engine whenever the temperature of the water decreases below a predetermined limit.

These and other objects of my invention will become apparent in the following specification, reference being had to the accompanying drawings, and the means by which said objects are effectuated will be definitely pointed out in the claims.

In the drawings:—

Figure 1:
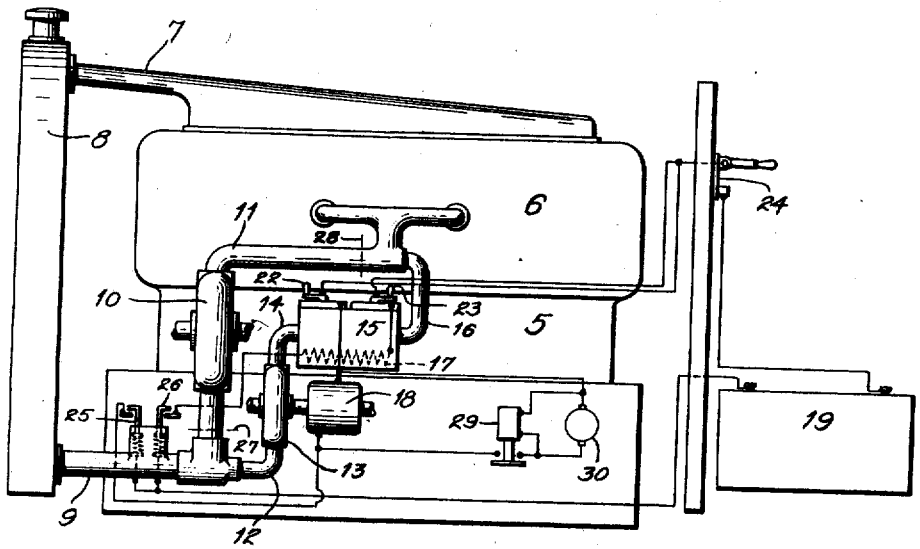
Figure 1 is a side view of an internal combustion engine equipped with my improved temperature regulator.

5 is an engine provided with the usual water jacket 6. Said water jacket is connected by the duct 7 with the top of the radiator 8. The bottom of the radiator is connected by the duct 9 with the pump 10 and the latter is connected by the duct 11 with the water jacket 6.

The pump 10 is to be operated in any usual or approved manner, its purpose being to circulate the water through the jacket 6 and radiator 8. The radiator 8 is to be cooled in any usual or approved manner as by the usual fan, not shown.

A duct 12 leads from the duct 9 to the auxiliary pump 13. The duct 14 leads from the pump 13 to the heater 15 and the duct 16 leads from said heater to the duct 11.

The heater 15 is divided into an upper and lower compartment. Through the upper compartment passes the water of the cooling system and a heating element 17 is mounted in the lower compartment for a purpose hereinafter explained.

The pump 13 is to be driven by the electric motor 18 which receives current from the storage battery 19.

Rheostats 20 and 21 comprising the controlling handles 22 and 23 are employed for controlling respectively the speed of the motor 18 and the heat evolved by the element 17.

The main switch 24 is preferably mounted upon the instrument board.

Thermostats 25 and 26 are mounted upon the duct 9 adjacent the radiator 8 for the purpose of controlling the motor 18 and the heating element 17, respectively.

The operation of my improved temperature regulator is as follows:—

In starting, if the engine 5 is cool, the contacts of the thermostats 25 and 26 will be in electric connection so that when the main switch 24 is closed, electricity will pass from the storage battery 19 through said thermostat and through the heating element 17 and motor 18. The motor 18 will then operate the pump 13 to circulate through the water jacket 6 and radiator 8 and the heating element 17 will begin to heat said water.

By moving the handles 22 and 23, the speed of the motor 18 and the heating effect of the element 17 may be both varied so that the cooling water may be heated to any desired temperature before starting.

After the motor 18 and heating element 17 produce their respective effects for a sufficient length of time the cooling water will reach such a temperature that the contacts of the thermostats 25 and 26 will separate, thus stopping the motor 18 and terminating the heating effect of the element 17.

If the engine 5 is started but cools off, the contacts of the thermostat 25 will close and start the motor 18 to again initate the circulation of the cooling water. The motor 18 will then run until the cooling water reaches a certain predetermined low temperature and then the contacts of the thermostat 26 will close, causing a current of electricity to pass through the heating element 17 which will raise the temperature of the cooling water.

When the engine 5 is started and it has run sufficiently long to heat up the cooling water to a predetermined temperature, then the contacts of the thermostats 25 and 26 will both be opened and the circulation of the cooling water will be carried on entirely by the pump 10.

After the engine 5 has been running and the car has been stopped, the engine and cooling water commence to cool off but the cooling water chills faster than the engine along the duct 9.

When the water in the duct 9 reaches a predetermined temperature, the thermostat 25 is set to start the motor 18, the motor 18 then drives the pump 13 at a slow rate of speed and circulates the cooling water slowly, thus maintaining it at an approximately even temperature at all parts of the cooling system. When the temperature of the cooling water reaches a second predetermined limit, which is lower than the limit at which the contacts of the thermostat 25 closed, as before explained, then the contacts of the thermostat 26 close and the heating element 17 becomes effective, heating the circulating water to the proper degree to keep the engine sufficiently warm to enable it to start readily.

It is to be noted that after the first starting of the engine 5, the handles 22 and 23 are to be moved to a position in which the whole resistance of the rheostats 20 and 21 will be included in their respective circuits in order to provide for a slow speed of the motor 18 and a moderate heating effect of the element 17, when my improved regulator is operating as just described in order to maintain the temperature of the engine 5 at a sufficiently high point for starting.

Figure 2:
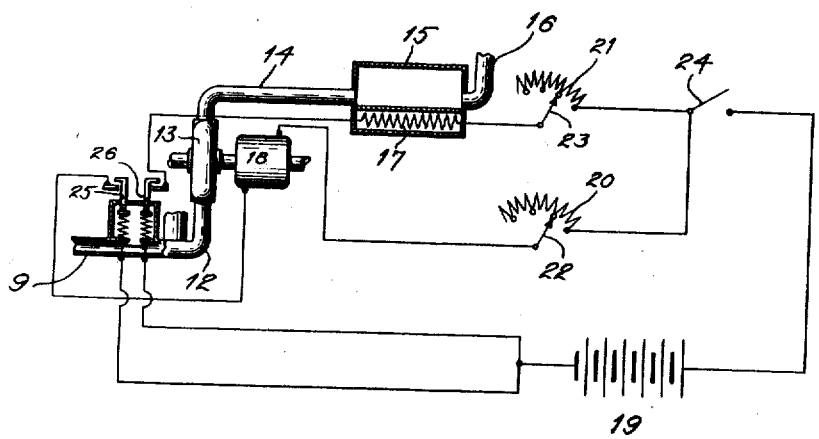
Fig. 2 is a diagram of the connections.

While I have shown the pump 13 as an auxiliary of the pump 10, it is to be understood that the pump 10 may be disconnected from the circulating system and the ducts 9 and 11 closed as at 27 and 28. With this variation in my improved regulator, an automatic switch 29 is provided, (not shown in Fig. 2), for the purpose of closing the circuit from the ordinary generator 30 through the motor 18 whenever the potential of the generator 30 reaches a predetermined limit.

While I have shown one preferred form of my invention, it is to be understood that this is for purposes of illustration only and in no wise to limit the scope thereof, for many changes may be made in the structures and combinations shown and described without departing from the spirit of my invention.

I claim:—

1. In the cooling system for the water of an internal combustion engine, the combination of an electric motor driven pump for circulating said water, a heater provided with heating coils for heating said water, a source of electrical energy, electric circuits including said motor, coils and source, a thermostat for closing the circuit through said motor when the temperature of said water reaches a predetermined limit, a second thermostat adapted to close the circuit through said coils when the temperature of said cooling system reaches a second predetermined limit lower than said first named limit, and rheostats in said motor and heater circuits.

2. In the cooling system for the water of an internal combustion engine, the combination of an electric motor driven pump for circulating said water, a heater provided with heating coils for heating said water, a source of electrical energy, electric circuits including said motor, coils and source, a thermostat for closing the circuit through said motor when the temperature of said water reaches a predetermined limit, a second thermostat adapted to close the circuit through said coils when the temperature of said cooling system reaches a second predetermined limit.

3. In the cooling system for the water of an internal combustion engine, the combination of an electric motor driven pump for circulating said water, a heater provided with heating coils for heating said water, a source of electrical energy, electric circuits including said motor, coils and source, a thermostat for closing the circuit through said motor when the temperature of said water reaches a predetermined limit, a second thermostat adapted to close the circuit through said coils when the temperature of said cooling system reaches a second predetermined limit, and a hand operated switch for disconnecting said source from said circuits.

4. In the cooling system for the water of an internal combustion engine, the combination of a generator driven by said engine, an electric motor driven pump for circulating said water, a source of electrical energy, an electric circuit including said generator, motor and source, a thermostat for closing the circuit through said motor when the temperature of said water reaches a predetermined limit, and an automatic switch for closing said circuit through said generator when the potential of said generator reaches a predetermined limit.

5. In the cooling system for the water of an internal combustion engine, the combination of an electric motor driven pump for circulating said water, a source of electricity, an electric circuit including said motor and source, means for closing said circuit whenever the temperature of said water reaches a predetermined limit, and a second pump for circulating said water driven by said engine.

6. In the cooling system for the water of an internal combustion engine, the combination of an electric motor driven pump for circulating said water, a source of electricity, an electric circuit including said motor and source, means for closing said circuit whenever the temperature of said water reaches a predetermined limit, a second pump for circulating said water driven by said engine, a rheostat for heating said water and means for closing the circuit from said source through said rheostat whenever the temperature of said water reaches a predetermined limit.

In testimony whereof, I affix my signature.

LOUIS W. JONES.